July 4, 1950   C. A. COOK   2,513,286
VEHICLE DRIVE MECHANISM
Filed Dec. 10, 1947   4 Sheets-Sheet 1
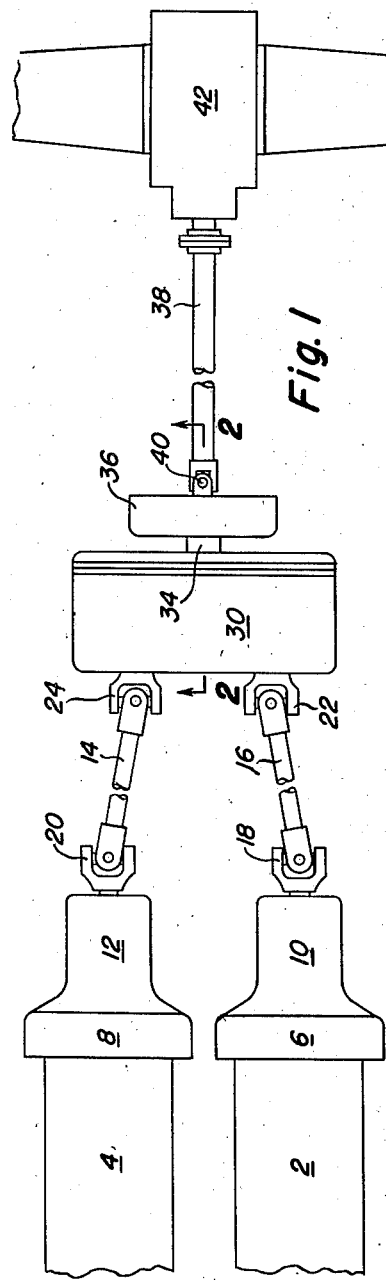
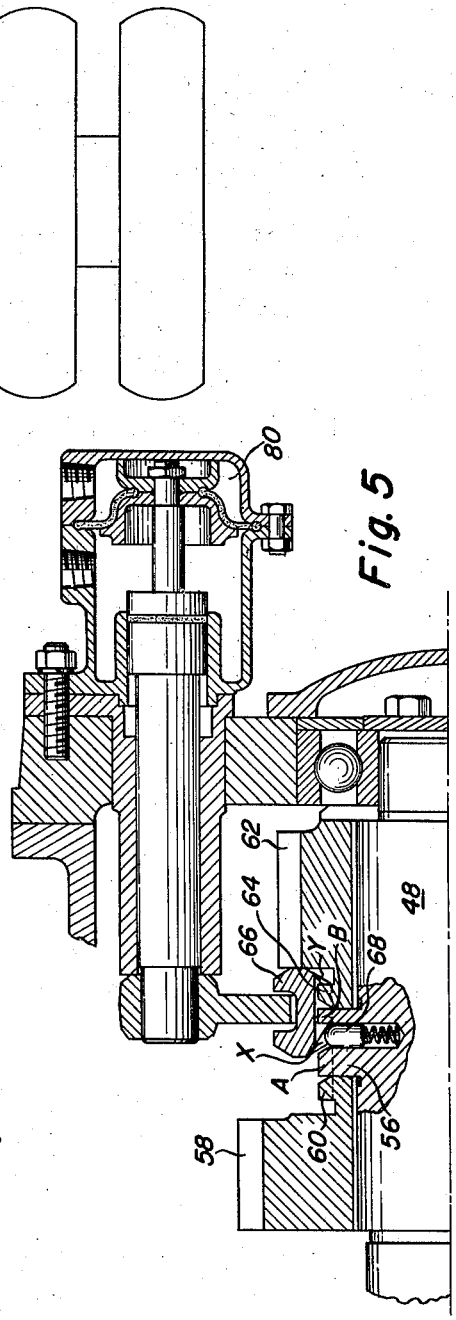
INVENTOR.
Charles A. Cook
BY
Strauch & Hoffman
Attorneys

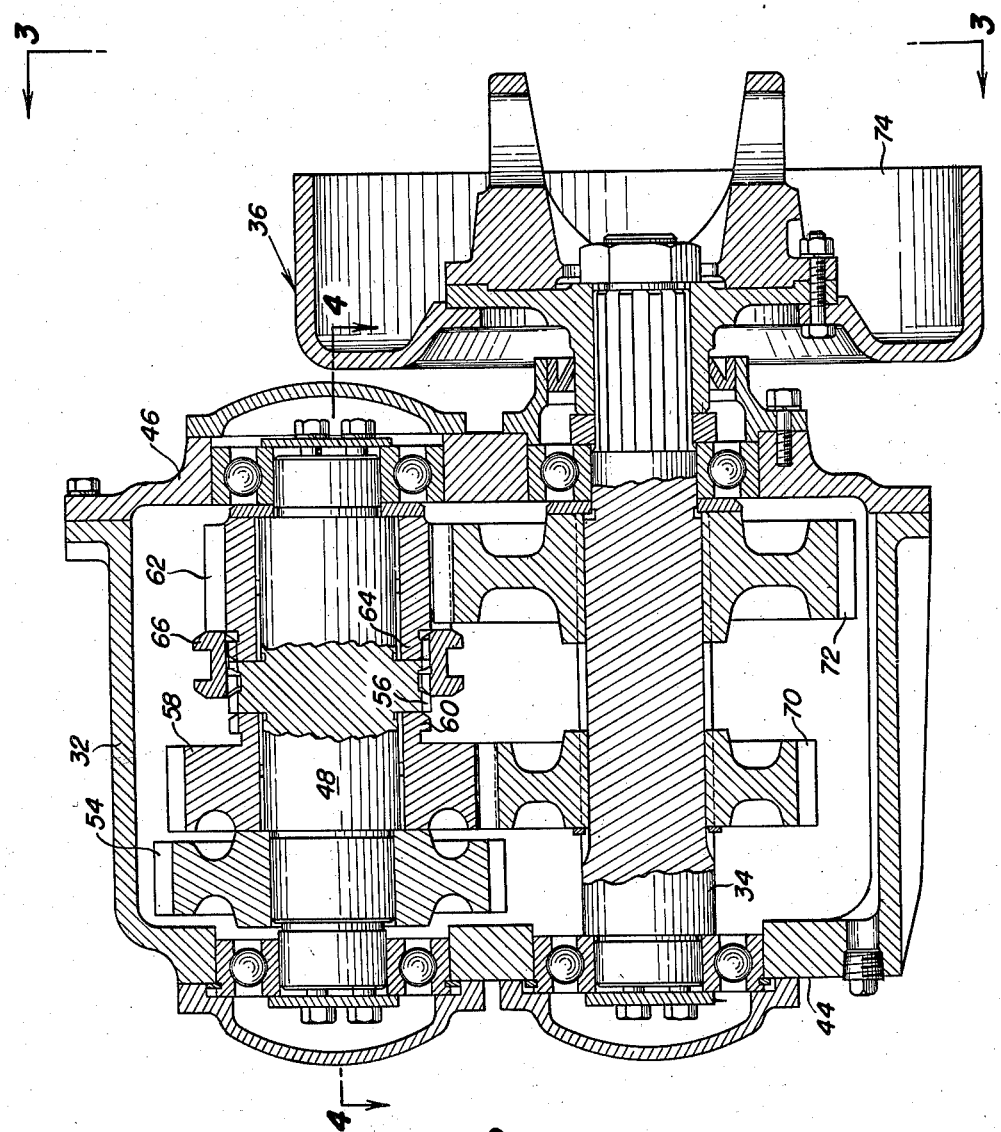

July 4, 1950 C. A. COOK 2,513,286
VEHICLE DRIVE MECHANISM
Filed Dec. 10, 1947 4 Sheets-Sheet 3

INVENTOR.
Charles A. Cook
BY
Strauch + Hoffman
Attorneys

July 4, 1950

C. A. COOK 2,513,286

VEHICLE DRIVE MECHANISM

Filed Dec. 10, 1947

INVENTOR.
Charles A. Cook
BY
Strauch & Hoffman
Attorneys

Patented July 4, 1950

2,513,286

UNITED STATES PATENT OFFICE 2,513,286

VEHICLE DRIVE MECHANISM

Charles A. Cook, Oshkosh, Wis., assignor to The Timken-Detroit Axle Company, Detroit, Mich., a corporation of Ohio Application December 10, 1947, Serial No. 790,833

5 Claims. (Cl. 74—665)

1

This invention relates to vehicle drive mechanisms and more particularly to dual powered mechanisms of this type in which driving torque is transmitted from a pair of engines through a common propeller shaft to a vehicle axle.

It is the primary object and purpose of the present invention to provide a vehicle drive mechanism of this type including a novel torque accumulating and transmitting unit suitably mounted in the vehicle frame and in which the several power transmitting shafts and gearing are so assembled and arranged as to provide for a low center of gravity with maximum road clearance.

It is a more particular object of the invention to provide a torque accumulating mechanism embodying a pair of power input shafts drivingly connected with the respective engines and an intermediate counter-shaft geared to said input shafts with the axes of all of said shafts disposed in a common horizontal plane.

A further object of the invention resides in the provision of a power output shaft mounted below and in vertical alinement with the counter-shaft, drivingly connected with the propeller shaft for the vehicle axle, together with means on the counter-shaft for transmitting the accumulated power torque to said output shaft at relatively different selective speeds.

With the above and other subordinate objects in view, the invention comprises the improved vehicle drive mechanism and the construction and relative arrangement of the several parts as will hereinafter be more fully described, illustrated in the accompanying drawings and subsequently incorporated in the subjoined claims.

In the drawings, wherein I have disclosed one simple and practical embodiment of the invention and in which similar reference characters designate corresponding parts throughout the several views.

Figure 1 is a schematic plan view illustrating a preferred embodiment of my improved vehicle drive mechanism.

Figure 2 is a vertical section taken substantially on the line 2—2 of Figure 1, illustrating preferred selective speed transmission means between the counter-shaft and the output shaft of the torque accumulator mechanism.

Figure 5 is a fragmentary sectional view taken

Figure 3:
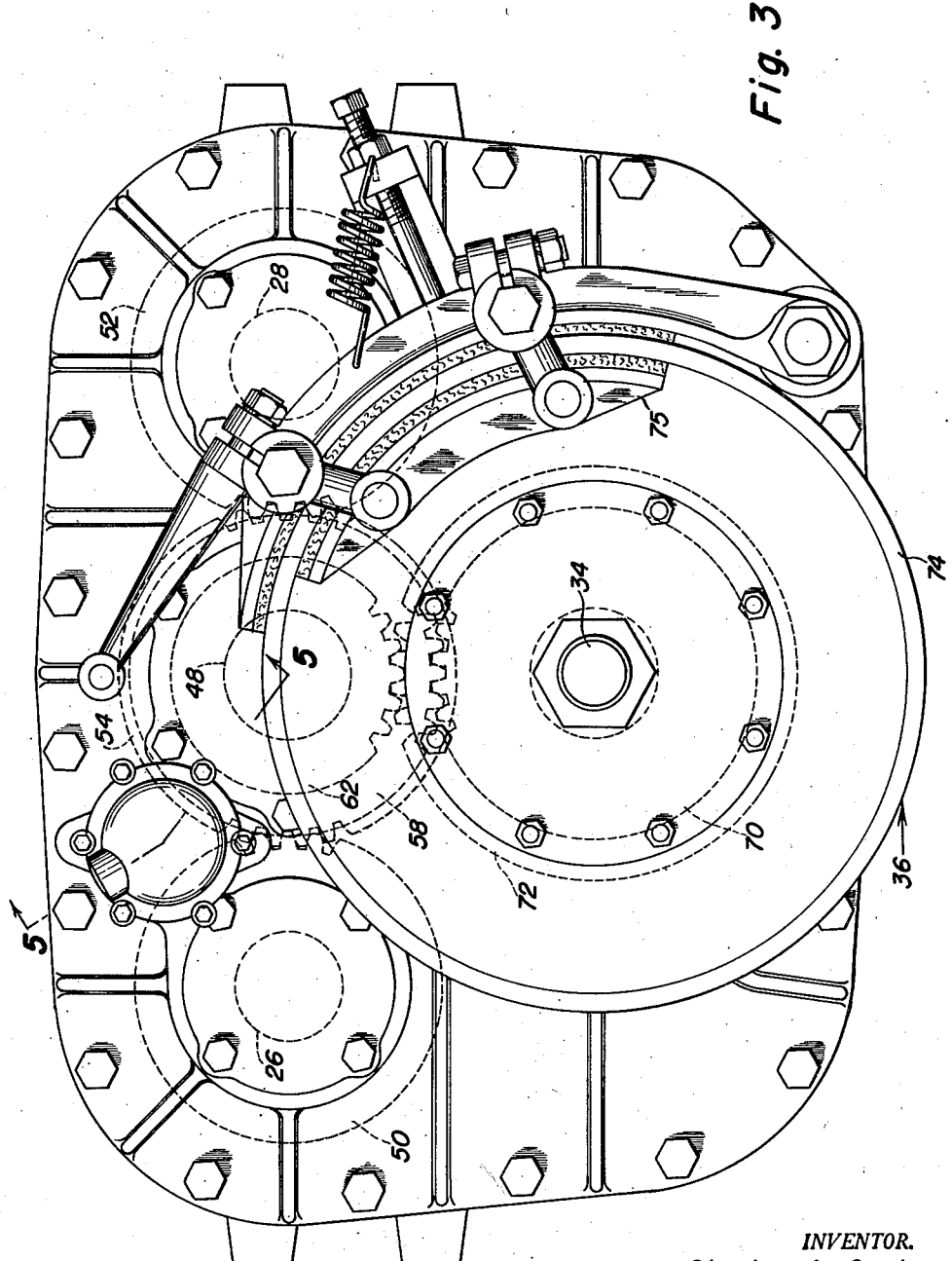
Figure 3 is a rear elevation of the torque accumulating unit as indicted by the line 3—3 in Figure 2.
Figure 4:
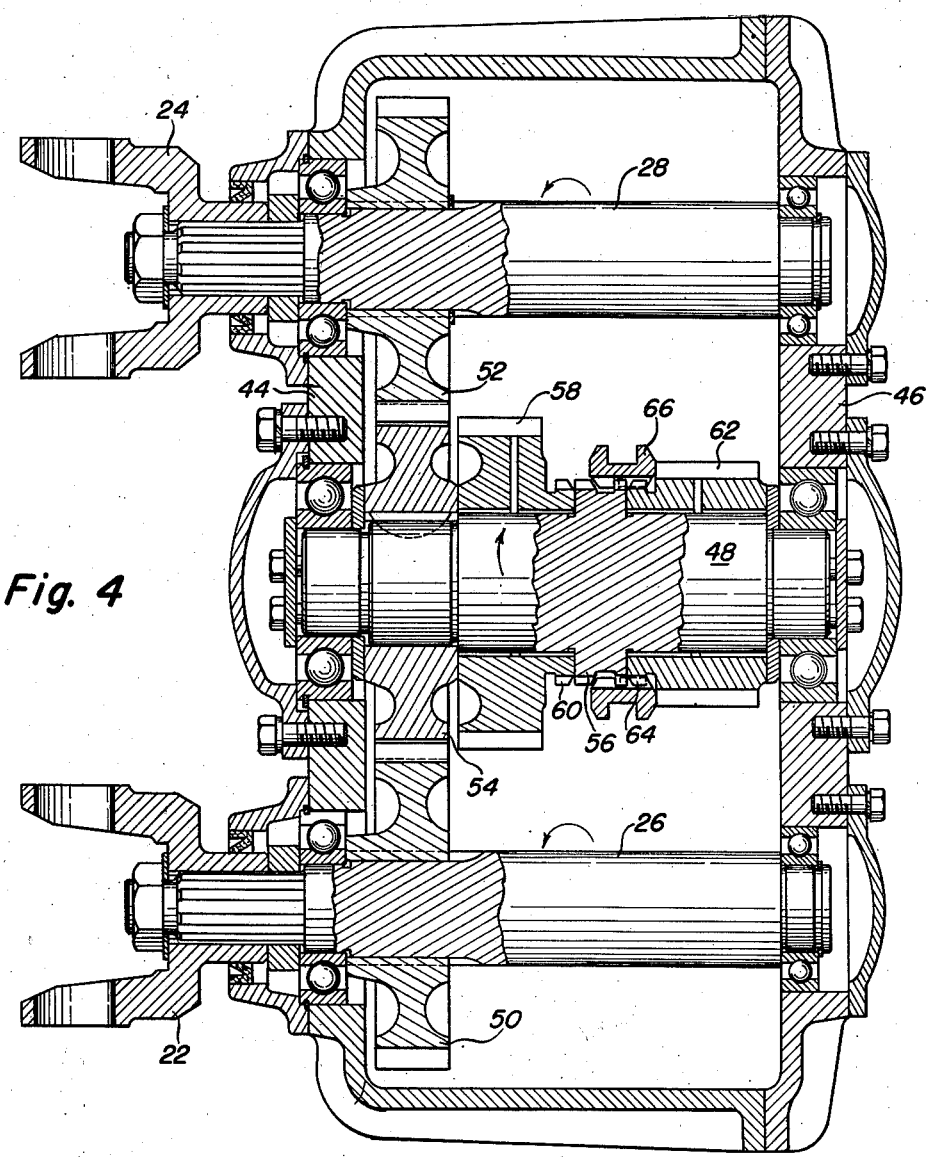
Figure 4 is a horizontal sectional view taken substantially on the line 4—4 of Figure 2.

2 substantially on the line 5—5 of Figure 3 and illustrating the actuator for the shiftable speed selector member on the counter-shaft.

For purposes of illustration, I have shown two identical engines of conventional type, indicated at 2 and 4 respectively, mounted in the vehicle frame (not shown) in parallel side by side relation longitudinally thereof. These engines are connected by conventional friction clutch means, 6 and 8 respectively, with standard variable speed transmission units 10 and 12 respectively. Conventional manually operable means (not shown) is provided for simultaneously actuating the clutches and the corresponding gear shift members of the transmission units. Drive shafts 16 and 14 are connected by universal joints 18 and 20 to the output shafts of the respective transmission units. The drive shafts extend rearwardly and inwardly from the universal joints 18 and 20 of the output shafts of the respective transmissions 10 and 12 and are connected at their rear ends by similar universal joints 22 and 24 to spaced parallel input shafts 26 and 28 respectively of the torque accumulating unit, generally indicated at 30. These input shafts and a rearwardly extending output shaft 34 are journalled in suitable anti-friction bearings mounted in front and rear end walls 44 and 46 respectively of a housing structure 32. Externally of this housing a suitable brake mechanism, generally indicated at 36 is associated with the rear end of the output shaft 34. A propeller shaft 38 is universally connected, as at 40, to the rear end of the output shaft 34 at one of its ends and at its other end is drivingly connected with the wheel axle 42 of the vehicle.

Between the output shafts 26 and 28 and equidistantly spaced therefrom, an intermediate counter-shaft 48 is also journalled at its ends in suitable anti-friction bearings mounted in the front and rear walls of the housing 32. The axes of the input shafts and the counter-shaft are disposed substantially in the same horizontal plane. Similar gear members 50 and 52 are non-rotatably secured to the input shafts 26 and 28 respectively. A gear member 54 non-rotatably mounted on the counter-shaft 48 is in constant mesh with the gears 50 and 52 on the respective input shafts.

As shown in Figure 2 of the drawing, the counter-shaft 48 is provided with a splined portion 56 of enlarged diameter spaced substantially equidistantly between gear 54 and the rear wall 46 of the housing. A gear member 58 is rotat- ably journalled on the counter-shaft between the gear 54 and the enlarged shaft section 56 and is provided with an axially extending externally splined hub 60 which abuts said shaft section 56. The spline teeth on this hub correspond in number to those on the splined portion of the shaft. A second gear member 62 is rotatably journalled on the counter-shaft at the opposite side of the shaft section 56 and between the same and the rear wall 46 of the housing. This gear is also formed with an axially extending externally splined hub 64 which abuts the shaft section 56 and has spline teeth corresponding in number with those on said shaft section.

An annular clutch collar 66, axially slidable on the splined section 56 of the counter-shaft, is provided with internal splines slidably coacting with the splines on said shaft section. The clutch collar may be moved axially in one direction so that its internal splines are in engagement with both the splined section 56 of the counter-shaft and the splined hub 60 of gear member 58, thereby non-rotatably locking the gear member 58 to the counter-shaft. Similarly, when the clutch collar is axially moved in the opposite direction, its internal spline teeth will engage both the splines on shaft section 56 and the splines on hub 64 of gear member 62, thereby non-rotatably locking the latter gear member to the counter-shaft.

A plurality of spring loaded plungers 68 are mounted in the section 56 of the counter-shaft for movement radially thereof and serve to hold the collar 66 in its selectively shifted position by cooperative engagement of said plungers with certain of the internal splines of the clutch collar.

The output shaft 34 is mounted in housing 32 beneath the intermediate or counter-shaft 48 with its axis disposed substantially in the same vertical plane as the axis of the counter-shaft, the distance between said counter-shaft and output shaft axes being the same the distance between the axis of each input shaft and the axis of the counter-shaft.

A gear member 70 non-rotatably mounted on the output shaft 34 is of substantially the same diameter as gear member 58 on the counter-shaft and is in constant mesh therewith. Therefore, when the clutch collar 66 is shifted as above described to lock gear 58 to the counter-shaft, a substantially direct, one to one driving ratio, is established between the intermediate or counter-shaft and the output shaft.

A gear member 72 of relatively larger diameter is also non-rotatably secured to output shaft 34 and is in constant mesh with gear 62 journalled on the counter-shaft. Therefore, when clutch collar 66 is moved to lock the latter gear to the counter-shaft, a relatively low driving ratio is established between a said counter-shaft, and the output shaft.

A brake drum 74 is non-rotatably secured to the output shaft externally of the housing 32 and conventional brake shoe means 75 (Figure 3) is mounted on the housing and adapted to be operated by any approved mechanism to cooperate with the wall of the brake drum and apply braking torque to the output shaft 34.

In the preferred embodiment of the invention, the enlarged splined portion 56 on the counter-shaft is divided into two sections A and B respectively which are separated by a groove. The spline teeth of the clutch collar 66 are also divided into two sections, X and Y respectively, which are also separated by a groove. The spline teeth of section Y on the clutch collar are formed to provide a greater amount of backlash than the teeth of section X. The clutching parts are so proportioned that, when the clutch collar is positioned to non-rotatably lock gear 62 to the counter-shaft, section X of the spline teeth of the collar are disposed within the separating groove between sections A and B of the teeth on the counter-shaft, while section Y of the spline teeth on the collar are meshed with both the splined section B of the counter-shaft and with the splined hub of gear member 62.

When the clutch collar is shifted to lock gear 58 to the counter-shaft, splined section X of the collar is engaged with the splined hub of the gear 58 and the splined section A of the counter-shaft is engaged with the splined section Y of the collar. Since the splined section Y is formed with an excessive amount of backlash, the counter-shaft is permitted to rotate relative to the collar, thereby causing a slight misalignment between the spline teeth of section X of the collar and the spline teeth of section A of the counter-shaft so that the teeth sections A and X have abutting contact with each other at their opposed ends to thus prevent accidental disengagement of the collar from the gear member 58.

A conventional vacuum operated actuating motor 80 is operatively connected to shift the clutch collar 66 into selective engagement with either of the gears 58 or 62. The above described two speed drive mechanism is not specifically claimed herein, since it forms the subject matter of Brownyer Patent No. 2,398,407, April 16, 1946.

From the foregoing description and the accompanying drawings, it will be seen that I have provided a dual powered drive mechanism for vehicle axles embodying a torque accumulating unit of novel design, in which the driving torque of the two engines is accumulated through a single gear on the counter-shaft, together with a selective speed transmission means on said counter-shaft through which the accumulated power torque is transmitted to the power output shaft, with all of the gear elements remaining axially stationary and being in constant mesh with the cooperating gear elements. It will further be noted from reference to Figure 3 of the drawings that by the relative mounting and arrangement of the counter-shaft and the output shaft with respect to the power input shafts, a housing structure 32 of minimum dimensions may be employed and supported in the vehicle frame to provide a low center of gravity with adequate road clearance.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a torque accumulator, two engine driven input shafts, a countershaft disposed between said input shafts, similar gears on said input shafts each constantly meshed with a single gear fixed on said countershaft, an output shaft disposed below said countershaft, said countershaft having rotatably mounted thereon in spaced relation two gears of different size and being formed with a splined portion between said two gears, a clutch collar slidable on said splines to drive couple either of said two gears to said countershaft, and spaced gears fixed on said output shaft each constantly meshed with one of said two different size gears on the countershaft.

2. In the torque accumulator defined in claim 1, said two input shafts and the countershaft having their axes in a single horizontal plane, and said countershaft and the output shaft having their axes in a single vertical plane.

3. In the torque accumulator defined in claim 1, said countershaft axis being substantially equidistant from the axes of said input and output shafts.

4. In the torque accumulator defined in claim 1, a housing enclosing the same with all of said shafts having their opposite ends journalled in opposite side walls of said housing.

5. In a vehicle having a drive axle and a pair of side by side power plants each including an engine, a change speed transmission and a drive shaft connected to the transmission output, a torque accumulator mechanism interposed between said power plants and said axle comprising a pair of input shafts drive connected to the respective drive shafts, a countershaft disposed between said input shafts, a gear fixed on each input shaft and a gear on said countershaft constantly meshed with said input shaft gears, an output shaft drive connected with said axle and disposed below said countershaft, and speed change gearing between said countershaft and said output shaft for selectively driving the latter at different speeds, all of said shafts in said mechanism being parallel.

CHARLES A. COOK.

REFERENCES CITED

The following references are of record in the file of this patent:

UNITED STATES PATENTS

| Number | Name | Date |
| --- | --- | --- |
| 1,768,530 | Short | June 24, 1930 |
| 1,802,277 | Schellentrager | Apr. 21, 1931 |
| 2,132,450 | Wolf | Oct. 11, 1938 |
| 2,219,249 | Blagden | Oct. 22, 1940 |
| 2,383,873 | MacPherson | Aug. 28, 1945 |
| 2,422,173 | Wilson | June 10, 1947 |
| 2,445,760 | Buckendale | July 27, 1948 |